United States Patent [19]

Bell

[11] Patent Number: 4,620,793

[45] Date of Patent: Nov. 4, 1986

[54] MIXER DEVICE

[75] Inventor: Wilson A. Bell, Southbury, Conn.

[73] Assignee: USM Corporation, Farmington, Conn.

[21] Appl. No.: 712,871

[22] Filed: Mar. 18, 1985

[51] Int. Cl.⁴ .............................. B01F 7/02; B29B 1/08
[52] U.S. Cl. ......................................... 366/76; 366/84; 366/97; 366/300
[58] Field of Search .............................. 366/76, 83–86, 366/97, 181, 150, 297, 298, 299, 300, 301; 425/201, 207, 208

[56] References Cited

U.S. PATENT DOCUMENTS

| | | | |
|---|---|---|---|
| 1,516,488 | 11/1924 | Banbury | 366/76 |
| 1,520,001 | 12/1924 | Banbury | 366/76 |
| 2,495,242 | 1/1950 | Jones | 366/177 |
| 3,490,750 | 1/1970 | Brennan | 366/85 |
| 3,610,585 | 10/1971 | MacLeod | 366/300 |
| 4,512,664 | 4/1985 | Oiwa | 366/76 |

Primary Examiner—Robert W. Jenkins
Attorney, Agent, or Firm—Aubrey C. Brine

[57] ABSTRACT

A mixing device is provided having spaced end frames and side walls defining an internal mixing chamber and a removable hopper affixed thereto for receiving material to be fed into the chamber. A weight extends into the hopper and the chamber to force the material through the hopper and into the mixing chamber. A sleeve is provided to protect the internal portion of the mixer within the end frames from abrasion due to sidewise motion of the weight during mixing and extend upward into the hopper to inhibit relative motion between the hopper and the mixer frames and side walls during the mixing process.

5 Claims, 3 Drawing Figures

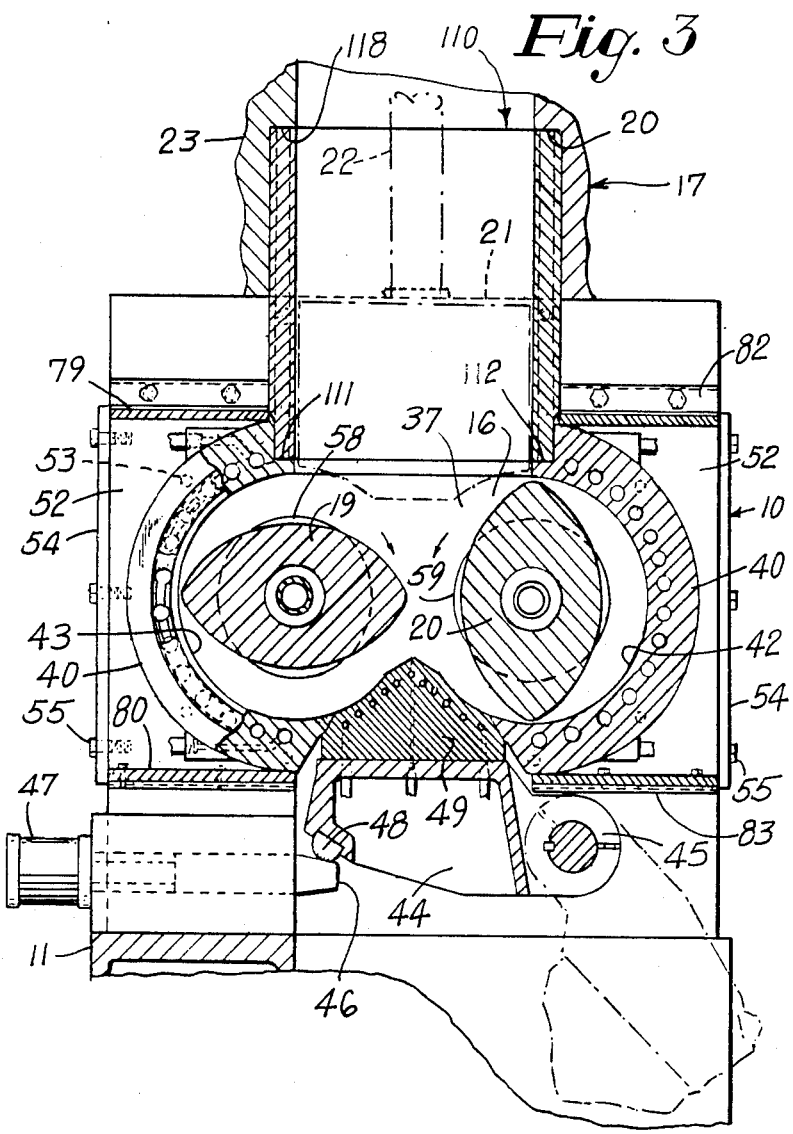

MIXER DEVICE

BACKGROUND OF THE INVENTION

The present invention relates to a mixing device of the type having an internal mixing chamber provided with bladed rotors for mixing material, and having a separable hopper for feeding the material into the mixing chamber.

In U.S. Pat. No. 3,610,585 issued to Macleod et al and assigned to the assignee of the present invention, there is shown a mixer wherein the material is worked in the chamber under considerable pressure, and may initially consist of powders or other finely divided materials which may have a tendency to escape from the chamber. Therefore, it is desirable that the mixing chamber be adequately sealed. From time to time the chamber must be cleaned of residue and wearable parts must be replaced. It is also desirable that the apparatus be so constructed that it may be readily disassembled and reassembled. The referred to patent provides a new and improved construction which is easy to assemble, dismantle and reassemble and which provides easily replaceable parts which may be subject to wear from the mixing action.

The structure disclosed in the U.S. Pat. No. 3,610,585 further provided a hopper removably mounted onto an opening leading to the mixing chamber and a weight or plunger extending through the hopper and into the chamber to force the material to be mixed down through the hopper and into the chamber. The hopper is removably secured to the mixing chamber for the purpose of easy assembly and dismantling of the device, for reasons set forth above.

The structure discussed above has proved to be successful; however, it has been found that in some instances the fasteners employed to hold the hopper to the mixer body have a tendency to loosen during the mixing operation. This apparently occurs as a direct result of the weight which is lodged into the hopper and the mixing chamber having a tendency to be moved from side to side causing lateral motion and subsequent lateral forces against the hopper sides as well as the internal area of the mixing chamber. In the design of the mixer shown in the prior art patent herein discussed, the motion of the weight on that portion of the mixing chamber adjacent the hopper has been protected by a plurality of wear plates which extend in the mixing chamber upward to the joint at which the hopper is attached to the body of the mixing chamber. This however provides for a difference in flexibility of the walls of the hopper extending above the joint between the hopper and the mixing chamber, and that portion of the mixing chamber having the wear plates. The problem is most critical when the weight is moved upwardly into the hopper by the material being mixed, during the mixing motion.

It is therefore an object of the present invention to provide a mixing device of the type referred to having increased structural reliability over devices of the prior art.

It is a further object of the present invention to provide a mixer of the type described having means for protecting the joint between the hopper and the mixing device which further serves to protect both the mixing chamber and the hopper from excessive abrasive wear.

SUMMARY OF THE INVENTION

The present invention serves to solve the problems enumerated above by providing a mixing device for mixing material into a plastic state having spaced apart end frame members and side wall members internally defining a mixing chamber in the form of adjacent cylinders with mixing rotors supported by the end frame members extending through the mixing chambers. A pair of side assemblies each of which has wall means defining a portion of the surface of a cylinder and including flange members at opposite ends thereof are provided wherein the flange members have upper and lower substantially parallel edge surfaces and a horizontally directed recess defined in each end frame arranged to receive the edge surfaces of the flange members so that the side assemblies may be slid horizontally into and out of the end frames. The side assemblies define a bottom doorway for discharge of material from the chamber and an upper opening for introduction of the material into the chambers is provided. Wall structure forming a removable feed hopper is joined to the end frames providing a passage to the upper opening and a movable weight extends through the hopper and into the upper opening to force the material through the hopper and into the mixing chamber. Wall structure is provided defining a sleeve disposed within the hopper and extending through the upper opening into the mixing chamber, the sleeve member being affixed to the interior of the hopper wall structure and to the side wall and end frames to both inhibit relative motion between the feed hopper and the mixing chamber and to provide a wear surface disposed to be contacted by the weight during the mixing operation.

The sleeve may be formed by a plurality of separate plates, each plate extending from inside the feed hopper wall into the mixing chamber to substantially bridge the joint between the feed hopper and the end frames and side walls.

BRIEF DESCRIPTION OF THE DRAWINGS

The foregoing and other features of the invention together with novel details in construction will now be more particularly described in connection with an illustrative embodiment, and with reference to the accompanying drawing thereof in which:

FIG. 3 is an elevational view partially in section taken along the line III—III of FIG. I showing portions of that structure in detail.

DESCRIPTION OF THE PREFERRED EMBODIMENT

Figure 1:
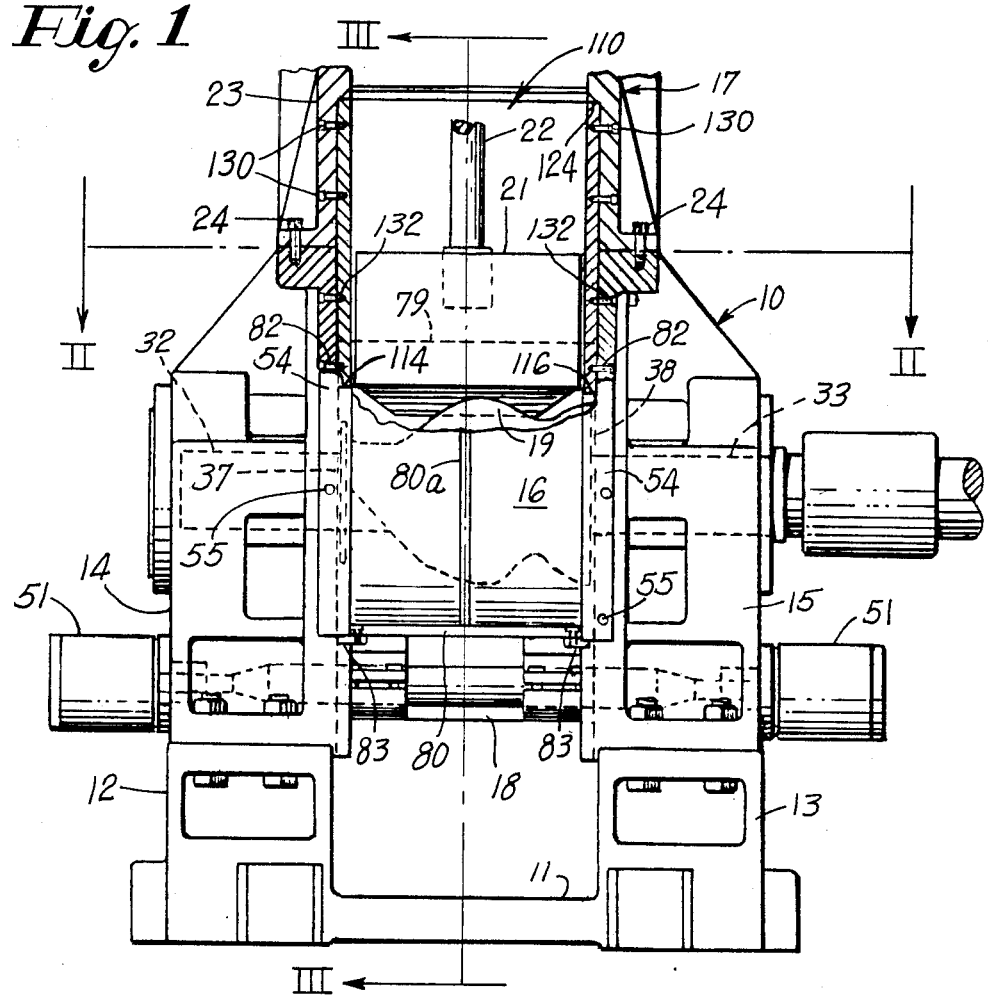
FIG. 1 is a side elevational view partially in section showing details of a mixing device constructed in accordance with the teachings of the present invention.

Referring to the drawing and in particular to FIG. I thereof there is shown a mixing device 10 which is preferably one similar to that described in detail in U.S. Pat. No. 3,610,585 issued to Douglas W. Macleod et al and assigned to the assignee of the present invention. Features of a mixer of that type may be found in greater detail in the aforementioned U.S. patent, which is herein incorporated by reference.

In FIG. I it is shown that the mixing device 10 comprises a base 11 having pedestal portions 12 and 13 which support end frame members 14 and 15 respectively. The device 10 defines a mixing chamber 16 which receives material in unfinished form through a removable chute or hopper 17 which defines a passage to the mixing chamber. Upon completion of the mixing, the material is discharged through a lower opening which is closed by a door 18. To provide for mixing of the material, a pair of mixing rotors 19 and 20 are disposed within the chamber 16.

A weight or plunger 21 carried on a rod or piston shaft 22 extends downwardly into the hopper 17 and is hydraulically or pneumatically operated to force the material to be mixed down through the hopper 17 into the mixing chamber 16. The hopper 17 is defined by a member 23 which is affixed to end frames 14 and 15 by means of bolts 24.

The journals 32 and 33 of each of rotors 19 and 20 are rotatably carried in bearings in end frames 14 and 15 respectively and the rotors extend through end plates 37 and 38 which define opposite ends of the mixing chamber 16.

As best shown in FIG. 3, the cylindrical side walls of mixing chamber 16 are defined by side assemblies which include members 40 and 41 having inner surfaces 42 and 43, respectively defined on a cylinder. The door assembly 18 comprises a support 44 mounted on a shaft 45. A plunger 46 which may be hydraulically or pneumatically operated by a cylinder 47 is adopted to engage an abutment or a lug 48 on its taper end surface and urge the door assembly 18 into sealing engagement with the edges of members 40 and 41, respectively. A closure member 49 is carried on the support 44 which together with the door 18 is adapted to be swung counterclockwise as viewed in FIG. 3 to permit the contents of the mixing chamber to be dropped through the bottom opening. Such motion is provided by actuators 51 which drive shaft 45.

The chamber defining members 40 and 41 are of similar construction and have integral flange members 52 at either end thereof which are secured to end frames 14 and 15 by bolts 53 and are further retained in place by means of an overlapping locking bar or stop member 54 bolted to end frames 14 and 15 by means of bolts 55 and bearing on the edge of flange 52.

The end plates 37 and 38 are received in complementary recesses defined in end frames 14 and 15 and are exemplified by end plate 37 shown in FIG. 3. Each of the end plates 37 or 38 is defined in one piece with circular openings 58 and 59 therethrough adapted to receive the shaft of the rotors.

Extending between the flange members 52 on either side of the apparatus are upper and lower plate members 79 and 80 shown in FIG. I with the rib member 80a therebetween. Plate members 79 and 80 are rigidly secured to flange members 52 and each of the chamber defining members 40 and 41 by welding. This provides a rigid box like construction which additionally facilitates removal and replacement of an entire side section of the mixer. A side section assembly which comprises one of the chambers 40 or 41, flanges 52, plates 79 and 80, and rib 80a, slides into horizontally directed recess in end frames 14 and 15. Disposed above and below the edges of flanges 52 are upper and lower spacing members 82 and 83 bolted to an end frame and lower plate 80 respectively.

Thus far the structure disclosed is substantially identical to that disclosed in the aforementioned U.S. Pat. No. 3,610,585. In that structure, the portion of the mixing chamber below the hopper 17 was defined by a plurality of wear plates which were secured to end frames 14 and 15 and were provided to prevent abrasion of the walls of the mixing chamber 16 caused by lateral movement of the weight 21 when it is located in the lower portion of the hopper.

Figure 2:
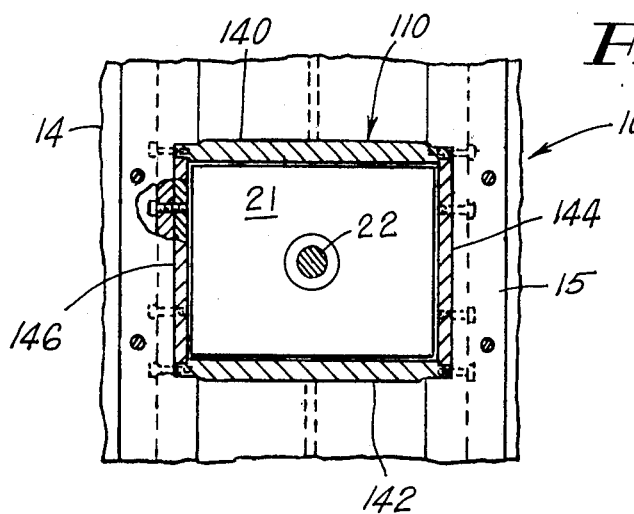
FIG. 2 is top plan view partially in section taken along the line II—II of FIG. 1, showing further detail of the structure of FIG. 1.

In the present structure, as best shown in the drawing, a sleeve 110 of rectangular structure has been provided and is supported on shoulders 111 and 112 of the members 40 and 41 and shoulders 114 and 116 formed in the end plates 37 and 38. That portion of the sleeve 110 which is disposed within the mixing chamber 16 substantially serves to provide a wear surface when contacted by the weight 21, both in the hopper 17 and the mixing chamber 16. Therefore, the wear plates disclosed in the prior art device of U.S. Pat. No. 3,610,585 have been omitted from the present structure. In the present invention, the sleeve 110 further extends upwardly past the joint between the hopper 17 and the attachment of the hopper to the end frames 14 and 15 and is received in the hopper 17 in recesses 118, 120, 122 and 124. The sleeve 110 is attached to the hopper by a plurality of fasteners 130 and affixed to the end frames by means of fasteners 132 shown in FIG. 2.

The sleeve 110 may be constructed by forming a structure similar to the wear plates, referred to above, that is, by two separate opposed pairs of rigid members 140, 142, 144 and 146 wherein the opposed pairs of plates have shoulders defined in their end portions to matingly receive the edges of adjacent plates.

As an alternate, the sleeve may be constructed in any manner such as by welding or other fastening means which would substantially provide a rigid rectangular box like structure, as disclosed.

The above described sleeve 110 extends substantially the same distance into the mixing chamber 16 and into the hopper 17 in the present embodiment. It is therefore evident, that when the weight 21 drops into the mixing chamber 16 through the hopper 17, the vibration and lateral motion produced by the mixing action is substantially taken up by the sleeve 110, which also provides a wear surface which effectively covers the distance over which the weight 21 may be located during the mixing action.

From the foregoing description it is considered evident that in the present construction, relative motion between the hopper 17 and the mixer 10 during the mixing motion is appreciably inhibited as both frictional wear and lateral force are both absorbed within the sleeve 110.

Having thus described my invention what I claim as new and desire to secure by Letters Patent is:

1. A mixing device for mixing material into a plastic state having spaced apart end frame members, and sidewall means internally defining a mixing chamber in the form of adjacent cylinders with mixing rotors supported by said end frame members extending through the mixing chambers; comprising a pair of side assemblies, each of said side assemblies having wall means defining a portion of the surface of a cylinder and including flange members at opposite ends thereof, said flange members having upper and lower substantially parallel edge surfaces, a horizontally directed recess defined in each end frame arranged to receive the edge surfaces of said flange members therein so that said side assemblies may be slid horizontally onto and out of said end frames, said side assemblies defining a bottom doorway for discharge of material from said chamber and an upper opening for introduction of material into said chamber, wall structure forming a removable feed hopper joined to said end frames providing a passage to said upper opening, and a movable weight extending through said hopper and into said upper opening to force the material through the hopper and into said mixing chamber, the improvement comprising wall structure defining a sleeve disposed within said hopper and extending through said upper opening into said mixing chamber, said sleeve member being affixed to said interior of said hopper wall structure and said side wall and end frame to both inhibit relative motion between said feed hopper and said mixing chamber and to provide a wear surface disposed to be contacted by said weight during the mixing operation.

2. A mixing device as set forth in claim 1 wherein said sleeve is formed of a plurality of separate plates each plate extending from inside said feed hopper wall into said mixing chamber to substantially bridge the joint between said feed hopper and said end frames and side walls.

3. A mixing device as set forth in claim 2 wherein said plurality of plates comprise two opposed pairs of elongated plates matingly engaged at their edges to form a rectangular sleeve.

4. A mixing device as set forth in claim 3 wherein said plates are of equal length and each extends for a substantially equal distance into said hopper and into said mixing chamber.

5. A mixing device as set forth in claim 1 wherein said sleeve extends for a substantially equal distance into said hopper and into said mixing chamber.

* * * * *